United States Patent [19]

Delnick

[11] Patent Number: 5,948,464
[45] Date of Patent: *Sep. 7, 1999

[54] PROCESS OF MANUFACTURING POROUS SEPARATOR FOR ELECTROCHEMICAL POWER SUPPLY

[75] Inventor: Frank M. Delnick, Dexter, Mich.

[73] Assignee: IMRA America, Inc., Ann Arbor, Mich.

[ * ] Notice: This patent is subject to a terminal disclaimer.

[21] Appl. No.: 08/767,468

[22] Filed: Jun. 19, 1996

[51] Int. Cl.[6] ........................................... B05D 5/12
[52] U.S. Cl. ........................... 427/77; 429/194; 429/248; 429/252
[58] Field of Search ....................................... 429/189, 190, 429/194, 248, 249, 252, 191, 192, 193; 427/77, 243, 247

[56] References Cited

U.S. PATENT DOCUMENTS

| | | | |
|---|---|---|---|
| 3,696,061 | 10/1972 | Selsor et al. | 260/2.5 M |
| 4,018,971 | 4/1977 | Sheibley et al. | 429/105 |
| 4,226,926 | 10/1980 | Goldberg et al. | 429/252 |
| 4,237,083 | 12/1980 | Young et al. | 264/41 |
| 4,681,750 | 7/1987 | Johnson et al. | 423/339 |
| 5,194,341 | 3/1993 | Bagley et al. | 429/189 |
| 5,325,601 | 7/1994 | Brownewell et al. | 34/247 |
| 5,336,573 | 8/1994 | Zuckerbrod et al. | 429/252 |
| 5,350,645 | 9/1994 | Lake et al. | 429/124 |
| 5,384,685 | 1/1995 | Tong et al. | 361/503 |
| 5,401,596 | 3/1995 | Stoilov et al. | 429/191 |
| 5,429,891 | 7/1995 | Gozdz et al. | 429/192 |

*Primary Examiner*—Arun S. Phasge
*Assistant Examiner*—Thomas H. Parsons
*Attorney, Agent, or Firm*—Knobbe, Martens, Olson & Bear, LLP

[57] ABSTRACT

A method of forming a porous composite separator layer for an electrochemical cell comprising the steps of printing a thin layer of a separator precursor solution on the surface of one of the electrochemical cell electrodes, drying and curing the thin layer of separator precursor solution so that it transforms into a microporous composite separator structure. In the preferred embodiment, the separator precursor solution is formulated as an ink comprising a silica aerogel filler material dispersed in a solution of polymer binder which is dissolved in a suitable solvent. The process allows the manufacture of thin and flexible composite separators which are conformally bonded to the underlying electrodes.

20 Claims, 1 Drawing Sheet

PROCESS OF MANUFACTURING POROUS SEPARATOR FOR ELECTROCHEMICAL POWER SUPPLY

BACKGROUND OF THE INVENTION

Field of the Invention

The present invention generally relates to electrochemical cell design and fabrication and, more particularly, to techniques for forming electrically insulating separator elements between two electrically conductive surfaces.

Description of the Related Art

In microelectronics technology, the continuing trend of ultra large scale integration is driving the electronics industry to explore new materials and processes for fabricating devices having smaller size and better qualities. This is particularly relevant to the manufacture of electrochemical power supplies of high energy and power density for portable electronic devices such as portable computers, telephones, audio, video devices, pacemakers, etc.

Increasing power per unit volume and improving discharge characteristics depends on the ability to fabricate thinner electrochemical cells, of which thinner separator layers are a necessary ingredient. As such, the integrity and reliability of thin separators ($<50\,\mu$) are of great importance, and consequently have received increasing attention in the last decade.

The separator within an electrochemical cell has the primary function of physically and electrically separating the anode from the cathode thus preventing a short circuit within the cell. The separator must be an electrical insulator. In addition, the separator must permit ions to flow between the anode and the cathode. Typically, separators consist of mats, pellets, papers, cloths or polymer sheets that contain electrolyte within their pore structures. The ionic conduction occurs through the electrolyte phase contained in the contiguous pores of the separator when the separator is placed in intimate contact with the anode and cathode and the cell is charged or discharged. Therefore, the separator must be dimensionally stable and porous, with high electrolyte absorption and retention and a low ionic resistance.

The separator should also be flexible. It should accommodate electrochemical expansion and contraction of the anode and cathode during discharge and/or charge, and it should accommodate thermal expansion and contraction of the cell. The separator must also be resistant to oxidation and reduction. It must be insoluble in the electrolyte and it must resist corrosion by the other components of the cell and by the reaction products that are generated within the cell. The physical and chemical properties of the separator must be compatible with the equipment and processes which are used to manufacture the electrochemical cell. The separator must be thermally stable during the manufacture, storage, and use of the electrochemical cell. Finally, to minimize the ionic resistance of the separator, the separator must be made as thin as practical in consideration of the manufacturing process and the desired performance of the electrochemical cell.

In the prior art, these characteristics have been achieved in part by the use of silicon oxide compounds such as fumed silica, silica gel, silica aerogel, silica xerogel, silica hydrogel, silica sol, and colloidal silica. Other materials such as alumina, magnesia, kaolin, talc, diatomaceous earth, calcium silicate, aluminum silicate, calcium carbonate, and magnesium carbonate have also been used as inert fillers, extenders, or pore formers in separators.

In the prior art, various applications of these materials have led to the development of various types of electrochemical cell separator/electrolyte structures. In general, such prior art structures have been constructed in the form of an ionically conductive gel, a pellet, an ionically conductive solid or a liquid electrolyte filled porous separator element.

In one prior art application, for example, fumed silica is used as a gelling agent for hydrochloric acid electrolytes. The silica-hydrochloric acid gel can be impregnated into a polymeric foam to form an ion selective separator membrane for redox cells where the transport of chloride ions is desired. Similarly, in another application, silica gel is used to immobilize sulfuric acid electrolytes and thereby providing a method for making hermetically sealed dry accumulators.

In thermal battery technology, for example, a rather different approach is taken to form the separator element. Here, the separator element is fabricated by pressing blended and fused mixtures of fumed silica and an electrolyte salt into a pellet. Such prepared pellet separators are subsequently placed between the cathode and the anode electrodes of the thermal battery cell. With the application of heat, the electrolyte salt in the pellet becomes molten and ionically conductive, and thereby activates the battery cell. At elevated temperatures, the thermal battery separator element is held together by the capillary forces of the molten salt in the porous fumed silica matrix and does not require any separate binding material to retain the shape of the separator.

However, this technology has not been successfully applied to the manufacturing of ambient temperature battery cells. This is due to the weak capillary forces of most ambient temperature battery electrolytes which are not sufficient to maintain the integrity of the unbounded silica-electrolyte structure. Therefore, the separators for ambient temperature applications are thick, and provide a limited range of size and shape for design considerations.

Further, in thin film battery technologies, salinized fumed silica or alumina are used as inorganic filler materials to manufacture solid electrolytes. Such electrolyte films are formulated with a combination of a polymer matrix material, an electrolyte salt, a compatible solvent (plasticizer), a crosslinking agent, and a finely divided filler material. The resulting structure is a flexible and self-supporting polymer electrolyte film without porosity. In this film, the conduction of ions occurs in solid state within the electrolyte plasticized polymer. Particularly, the addition of inorganic fillers enhances the physical strength of the electrolyte film and substantially increases the subsequent level of electrolyte absorption, and subsequent substitution of the plasticizer. As a consequence, a separator is not required and the solid electrolyte serves the purpose of separating the anode from the cathode.

In thin film battery technology, the solid electrolyte films can be readily printed onto a surface of the electrode elements using screen printing and stencil printing processes. However, in the absence of a distinct separator element, compression of the electrolyte leads to short circuits and/or displacement of the electrode material. In fact, this condition is improved by the use of screen printed or stencil printed "stud" elements or "standoff" elements to strengthen the electrode elements and solid electrolyte elements against compression. Nevertheless, the low ionic conductivity of the solid electrolytes severely limits the use of these thin film batteries, particularly when high rate charge and/or discharge is required. Similarly, "studs" or "standoff" elements can be screen printed or stencil printed onto the surface of electrode elements in electrochemical capacitors. In such applications, the standoff elements are made of silica reinforced epoxy polymers to increase their strength.

However, in the prior art, much effort has been devoted to the production of silica incorporated microporous separator structures which use liquid electrolytes. Examples of such structures may include microporous silica separators from organosilicon polymers and composite separators comprising a silica filler material and a polymer binder.

In secondary battery technologies, for example, an ultrathin layer of microporous silica separator material can be formed on a lithiated ternary transition metal oxide electrode by decomposition of an organosilicon polymer solution. During the manufacturing process, a thin layer of an organosilicon polymer solution is coated on the surface of the battery electrode. After drying to remove the solvent, the coating is cured to a glassy film and then subjected to plasma oxidation to form micropores within the film. The resulting ridged, fenestrated silicate film serves as the separator. However, precautions must be taken to prevent unwanted oxidation of the active electrode by the plasma.

In the prior art, many of the aforementioned silica or non-silica filler materials are used to fabricate microporous battery separators having a composite structure. These filler materials are produced as finely divided solid particulates, and used as a vehicle for introducing porosity into and for reinforcing polymeric binder material utilized to fabricate the microporous separator. In fact, this composite nature of the separator element renders separators with high strength and flexibility. During an exemplary manufacturing process, the solid particulate material is blended with a binder material of choice and then this blend is loaded with a suitable solvent to form a paste. The separator element is formed by extruding this paste into a sheet form, and subsequently curing this sheet material to remove solvent and impart porosity to the separator structure.

In an early prior art application, silica gel was used as an inorganic filler and extender for such microporous separators comprised of high molecular weight polyolefin binders. Similarly, in another application, precipitated amorphous silica was used to manufacture microporous polymeric battery separators. In these separators, the silica was used in small proportions (typically <30%) to reinforce the polymeric material and to introduce porosity.

However, yet another prior art application includes a battery separator consisting of a polymer and silica filler in which the silica filler comprises up to 97% of the composite matrix. In this application, the preferred filler is precipitated silica or fumed silica.

Unfortunately, such high filler content adversely affects the mechanical properties of the separator and lowers its strength and flexibility. In order to overcome these limitations, in the prior art, such composite separator elements were extruded and laminated onto both sides of a fibrous polymeric sheet to improve the strength and flexibility of the separator element, i.e., to make it self supporting.

Although such prior art processes yield functional composite separators, these processes provide relatively thick separator layers which can cause excessive separation between the electrodes and thus increase the overall resistivity of the separator.

Additionally, material handling during the manufacturing process presents serious problems due to very small product dimensions which increase the production cost and labor. Similarly, lack of a conformal bonding between the electrodes and the separator element prevents the precise and secure positioning of the separator element in the electrochemical cell structure and wastes valuable cell volume. Furthermore, such inefficient packaging of the electrochemical cell increases the distance between the electrodes, thus further lowering the efficiency of the cell.

Thus, silicas and polymers have been used to make separators for electrochemical power supplies; and printing processes have been utilized to make solid electrolytes for printed electrochemical power supplies and microprotrusion separators for electrical charged storage devices.

However, the prior art has not devised a means to produce a printed porous separator for liquid electrolyte power supplies which simultaneously achieved all the characteristics of the most preferred separator. A preferred separator element should be thin, easily manufactured, inexpensive, porous, chemically inert, electrochemically inert, insoluble, thermally stable, lyophilic and conformally bonded.

SUMMARY OF THE INVENTION

The aforementioned needs are satisfied by the process of the present invention which comprises printing a thin layer of a separator precursor solution on the surface of one of the electrochemical cell electrodes, and drying or curing the thin layer of separator precursor solution so that it transforms into a microporous composite separator element on the electrode.

Specifically, a separator precursor solution is formulated as an ink comprised of a solid particulate material dispersed in a solution of a polymer binder which is dissolved in a suitable solvent. In the preferred embodiment the solid particulate material is silica aerogel material which constitutes the major component of the printed separator. The polymer binder of the ink solution may preferably comprise Polyvinlydene Fluoride-Hexafluoropropylene copolymer which is dissolved in BEEA [2(2Butoxy Ethoxy)Ethyl Acetate] solvent.

The separator ink is printed onto the surface of the electrode (anode and/or cathode) and then dried to remove the solvent. The remaining solid particulate polymer mixture is then cured in order to melt the polymer binder and to bond individual solid particulates to each other and to the electrode material. Hence, a separator body on an electrode plate is constructed by intermeshed networks of pore spaces and a solid separator body comprising solid particulates bonded together by a polymer binder.

Consequently, the process results in separator structures in the form of a porous composite layer on an electrode of an electrochemical cell. This structure is non-self supporting, ultra-thin, flexible and conformally bonded to the underlying electrode surface.

It will be appreciated that there are multiple aspects of the present invention. In one aspect of the present invention, a process for fabricating a porous composite separator for an electrochemical cell which includes an electrode is provide, the process is comprised of the steps of disposing a solution of separator precursor on the electrode, and transforming the solution of separator precursor so that the solution of separator precursor forms a porous composite separator that adheres to the electrode. In another aspect of the present invention, an electrochemical cell having a first layer of electrode material, a layer of porous composite separator material being disposed on the first electrode material, wherein the composite material defines a plurality of micropores and wherein the layer of porous composite material adheres to the first layer of electrode material, a second layer of electrode material superjacent to the porous composite layer and a liquid electrolyte contained within the plurality of pores of the porous composite separator material so that the electrolyte provides a conducting medium between the first and second electrode layers.

In yet another aspect of the present invention, an electrochemical cell having a liquid-electrolyte-permeable separator is provided which is comprised of a layer of solid particulate material supported directly on an electrode and a binder for the solid particulate material, the proportion of the binder to the solid particulate material being selected to permit liquid electrolyte to permeate throughout the layer of solid particulate material. In another aspect of the present invention, a process of forming a microporous separator for an electrochemical cell is provided which includes an electrode, the process comprising printing a continuous layer of the separator on the electrode; and drying the layer to form micropores therein. In another aspect of the present invention, an electrochemical cell having a liquid-electrolyte-permeable separator, is provided which comprises an electrode that is comprised of a matrix of solid particulate material supported directly on the electrode and sufficient binder to hold the solid particulate material in an open matrix which permits liquid electrolyte to permeate the layer of solid particulate material.

In yet another aspect of the present invention a process of forming a microporous separator for an electrochemical cell which includes an electrode, is provided, the process includes conformally bonding a continuous layer of the separator on the electrode and drying the layer to form micropores therein. In another aspect of the present invention, an electrochemical cell is provided comprising an electrode, a discontinuous layer of silica particles having voids therebetween supported directly on the electrode, and a fluid organic solution electrolyte is contained within the voids.

In yet another aspect of the present invention, an electrochemical cell is provided comprising an electrode, a discontinuous layer of silica particles having voids therebetween adjacent the electrode, and a fluid organic solution electrolyte contained within the voids, wherein the ratio of the specific resistivity of the electrolyte to the specific resistivity of the electrolyte filled separator is greater than 0.10, using a complex impedance measurement over the frequency range of 100,000 Hz to 0.01 Hz and a sinusoidal voltage of 5 mV.

These and other objects and advantages of the present invention will become more fully apparent from the following description taken in conjunction with the accompanying drawings.

DETAILED DESCRIPTION OF THE PREFERRED EMBODIMENT

As will be described hereinbelow, the process of the preferred embodiment provides a method to form a microporous bonded silica separator by selectively printing a separator-precursor, formulated as an ink, onto an electrode plate and subsequently curing it into a microporous structure which is capable of holding the electrolyte of the electrochemical cell.

Figure 1:
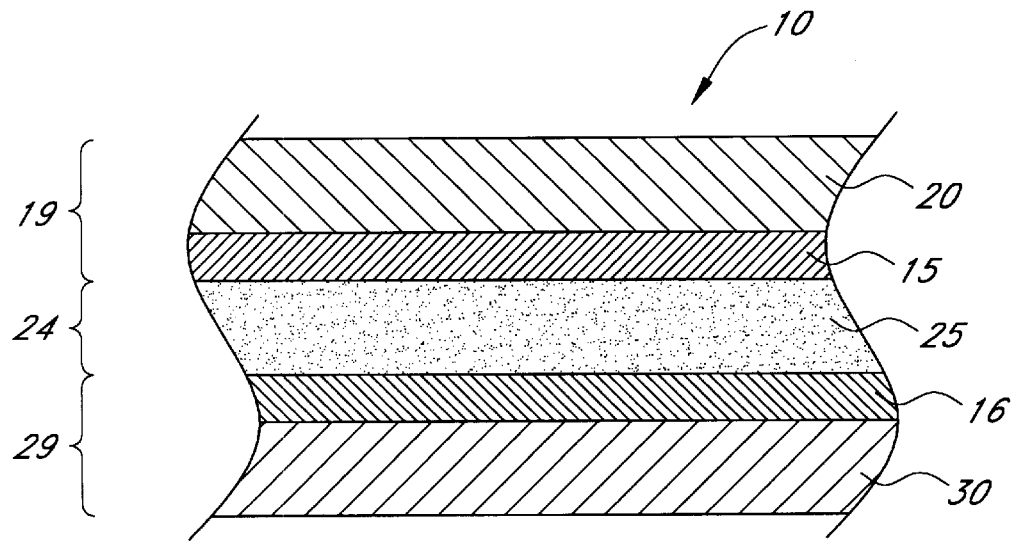
FIG. 1 is a schematic cross-sectional view of an exemplary electrochemical cell structure.

FIG. 1 illustrates an exemplary electrochemical cell structure 10 comprising a laminated array of three separate stacks including a cathode electrode stack 29, a separator/electrolyte stack 24 and an anode electrode stack 19. Each electrode stack may also comprise an electrode substrate 20,30 and an active material 15,16 (electrode) formed on the substrates 20,30. The substrates 20,30 function as current collectors for the electrodes 15,16 and permit current flow during the charge and discharge cycles of the electrochemical cell 10. The separator stack comprises a separator element 25 placed in intimate contact with the anode active material 15 and the cathode active material 16.

In accordance with the principles of the present invention, the separator element 25 of the electrochemical cell 10 is comprised of a porous composite material. The separator layer 25 prepared in accordance with the principles of the present invention exhibits enhanced performance in a very thin thickness regime, thereby allowing cell scalability to dimensions previously unattainable and performance surpassing that of prior separators that contain particulate reinforcements.

Figure 2:
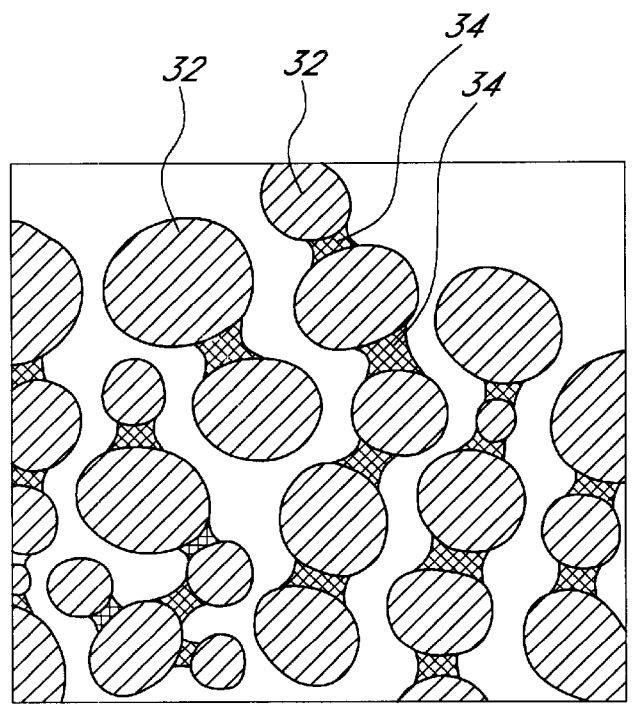
FIG. 2 is a highly magnified schematic illustration of the structure of the separator of this invention.

The porous composite-matrix structure of the separator element 25 of the present invention is shown schematically on a microscopic level in FIG. 2, and may comprise a suitable mixture of a solid particulate 32 and a polymer binder 34 which may be formed by drying and curing a separator precursor solution. The separator precursor solution is formulated as an ink comprised of a solid particulate material dispersed in a solution of the polymer binder which is dissolved in a suitable solvent. This separator ink is printed onto the surface of the active electrode element 15,16 (anode and/or cathode) and the solvent is removed by evaporation to form the separator element. The thin, porous, flexible structure of the separator 25 of the instant invention occurs as a result of the printing process and the ink formulation from which the separator 25 is printed. The solid particulate material which constitutes the major component of the printed separator 25 is preferably lyophilic with respect to the electrolyte of the intended electrochemical cell 10, and it must be dispersed in the solvent of the ink from which it is printed.

Examples of common materials used as the solid particulate material include, but are not limited to, silica aerogel, fumed silica, silica gel, silica hydrogel, silica xerogel, silica sol, colloidal silica, alumina, titania, magnesia, kaolin, talc, diatomaceous earth, calcium silicate, aluminum silicate, calcium carbonate, magnesium carbonate, or possible combinations thereof.

In this respect, it is observed that alumina and magnesia are the preferred particulate materials when the separator of the instant invention is used in electrochemical cells which contain aqueous alkaline electrolytes. However, it is also observed that fumed silica, silica gel, silica hydrogel, silica xerogel and silica aerogel are the preferred particulate materials when the separator of the invention is used in electrochemical cells which contain aqueous acidic electrolytes or nonaqueous electrolytes.

A presently anticipated preferred particulate material is silica aerogel which can be wetted by most electrochemical cell electrolytes. Silica aerogel is particularly promising as an easily dispersible material in preferred ink solvents. In this respect, the preferred particulate size range is from about 0.01 $\mu$ to about 1.0 $\mu$. Although several surface modifications can be made to the aerogel to improve its dispersion, it is inexpensive, and it is available in high purity and in particle sizes suitable for the preferred printing processes.

It is understood by those skilled in the art, that the polymeric binder may consist of a single polymer, a mixture of polymers, or a mixture of polymers and copolymers. Monomers may be included in the ink formulation which are subsequently polymerized after printing the separator. Polymers of the ink formulation may be crosslinked chemically or by appropriate radiation subsequent to printing the separator. Typical binders that may be used for these purposes consist of: polyvinyl chloride (PVC), polyvinylidene fluoride-hexafluoropropylene copolymer (PVDF), and ethylene propylene hexadiene monomer (EPDM).

In the process of the preferred embodiment, a separator ink solution is formed by a process which comprises dry mixing a separator element composition comprising a solid particulate material and a binder polymer, and adding this mixture stepwise to an appropriate ink solvent to dissolve it into an ink solution/paste. Various facilitating instruments such as blenders may be used to blend the solid particulate material and the binder polymer to create a more uniform separator element 25. Preferably, the separator ink is formulated to contain a ratio of polymer binder to solid particulate material ranging from about 5/95 to 35/65, more preferably 5/95 to 10/90. If desired, other materials may also be present in the ink formulation. For example, it is within the scope of the present invention to use a material which modifies the surface of the solid particulate for better wetting qualities. Such materials are well known in the art and may include magnesium silica fluoride or surfactants such as Triton X-100™ (octylphenoxypolyethoxy ethane (Union Carbide, Danbury, Conn.), Surfynol™ (3,6dimethyl-4-octyne-3,6diol (Air Products, Trenton, N.J.) or Fluorad™ (fluoroaliphatic polymer esters n ethyl acetate) (3M, St. Paul, Minn.). So long as compatibility exists with the materials of the electrochemical cell and the materials of the ink formulation, mixtures of such compatible solids may also be used to formulate the separator ink of the instant invention.

The solvent to be utilized in the present invention can be any agent or mixture of agents which will dissolve the polymer binder. In particular, a preferred solvent employed may be BEEA [2(2-Butoxy Ethoxy) Ethyl Acetate] solvent such as that available from Aldrich Chemical Co., Milwaukee, Wisc. Typically, the solvent content of the separator ink ranges from 60% to 75% by mass. However, this range is determined by the particular binder that is used, the particular silica, and the printing process. Once the ratio of polymer binder to solid particulate is established, the solvent composition and proportion is adjusted to optimize the ink viscosity for subsequent printing processes. In the preferred embodiment, the separator ink solution has a relatively low viscosity when agitated, but a relatively high viscosity when at rest. Thus, the solution has the features of being fluid, allowing printing processes, and also being less fluid when printed over the electrode surface. Therefore, during the printing process, the ink solution can be easily applied over the electrode surface by using any conventional screen or stencil printing technique. However, once applied over the electrode surface, the ink solution stays over and adheres to the application area.

Following preparation of the separator ink, this precursor is printed onto the surface of an active electrode element (anode and/or cathode) by using any known painting or printing process. It will be appreciated that screen and stencil printing methods are widely used in the electronics and the graphic arts industry to print thick film inks and/or solder paste. Typically, a squeegee traverses a patterned screen or stencil forcing ink through openings to provide a printed pattern. Equipment commonly used include screen printing machines which are available from MPM Corp. of Franklin, Mass. or DeHaart of Burlington, Mass. However, it will be appreciated by those skilled in the art that the printing process of the preferred embodiment can be performed using any of well known techniques in the art including other printing and painting techniques.

In the preferred embodiment, the separator ink is first printed onto the electrode plate. The separator ink is then dried in a vacuum oven at a temperature range of 90–130° C. and a pressure range of 1–200 Torr for about 15 to 20 hours to remove the solvent. The thickness of the separator element on the electrode is controlled by the viscosity of the separator ink and by the printing process. The dried separator ink on the electrode is then cured in order to melt the binder polymer and to bond individual filler particles to each other and to the active electrode surface, at the points of contact. In this respect, as the solvent of the separator ink is evaporated the capillary forces draw the filler particles together until they touch. Then, as it cures, the binder works like an adhesive and adheres individual filler particles to each other, leaving the interstices between the particles open. This curing process may preferably be performed thermally by heating the separator and the electrode substrate in a convection oven at about a temperature range between 190° C. and 240° C.

However, it is important to recognize that the precise conditions for the conversion of the separator ink to a separator, depends primarily on the polymer binder that is chosen. For example, if the binder polymer is a UV curable polymer, the curing process can also be performed using UV curing techniques. When UV curable polymer binders (e.g., urethanes) are used, UV light cures the binder after the above-described drying step. Alternatively, if the binder is a catalytically curable polymer (e.g., silicon resins), the curing process can be performed catalytically at lower temperatures (e.g., 150° C.).

By the application of curing processes, a separator body on an electrode plate is constructed of intermeshed networks of pore space and a solid separator body comprising solid particulates bonded together by the polymer binder, as shown schematically in FIG. 2. In fact, the solid body of the separator forms a composite structure which is disposed on and conformally bonded to an electrode plate. In this respect, the composite structure has the rigidity of the solid particulates and the flexibility of the polymer binder. Consequently, a thin and non-self supporting composite separator element can be formed, since the high mechanical strength of the electrode is used for mechanical support.

The thin film separator 25 of the present invention (FIG. 1) is bonded conformally to the active electrode element surface to form a porous, grafted, laminated structure, thereby substantially avoiding material handling problems and permitting an ultra-thin separator which is not self-supporting. Because of the printing process, the composite separator element of the present invention can be aligned, positioned and grafted to any suitable electrode structure whose geometric shape is consistent with the printing process. It will be appreciated that a substantial manufacturing advantage is further achieved when the separator is printed onto the surface of an electrode having an active surface material 15, 16 which is, in turn, printed according to a similar printing process.

In fact, it is particularly advantageous to utilize the same solvent and same polymer binder in the separator ink as is used to print the active portion 15, 16 of the electrode elements. Under these circumstances, the resulting laminated separator/electrode structures share the same binder with no binder composition gradient at the separator/electrode interface. This interface is less likely to delaminate due to thermal or electrochemical expansion or contraction occurring during manufacturing steps and operation conditions. In addition, the placement and grafting of the separator element to the electrode element substantially strengthens both elements and simplifies the assembly of the electrochemical cell. Hence, this process eliminates the labor intensive procedures of the prior art that are involved in the formation, alignment and assembly of separate and discrete separator and electrode elements. In fact, the lamination process disclosed here permits separators of 5–100 $\mu$ thickness which would not be possible if the separator element of the same composition had to be separately handled. In this respect, ultra thin separators which are frangible, and would thus be incapable of being manufactured separately, can be manufactured directly on the adjoining electrode, so that the electrode imparts the strength needed to support the separator.

The separator of the instant invention may be printed onto the surface of the cathode element, the anode element, or both electrodes of the electrochemical cell so long as the separator ink solvent is compatible with the electrode components. These electrode elements may consist of oxides, sulfides, carbon compounds, metals, alloys, and intermetallics. The separator may also be printed onto the carbon anodes of lithium-ion cells or onto the carbon cathode current collectors of cells which utilize liquid cathode depolarizers such as thionyl chloride or sulfur dioxide. Active electrode elements may consist of a single active material or a mixture of active materials such as manganese-oxides, cobalt-oxides, vanadium oxides or nickel oxides. Inert fillers, conductive additives and binders are also often incorporated into the electrode element. The separator of the instant invention may also be printed onto such composite structures.

After the formation of the porous separator element, the electrolyte is dispersed into the separator and consequently the other electrode is pressed firmly against the separator to form an electrochemical cell.

Within the context of this invention, electrochemical cells refer to: electrochemical capacitors which are sometimes referred to as supercapacitors or ultracapacitors; electrolytic capacitors; primary and secondary batteries; fuel cells, electrochemical sensors; and electrolysis cells which are used for the electrochemical synthesis and/or electrochemical decomposition of compounds. As certain formulations of the instant invention yield optically transparent separators when flooded with electrolyte, these selected formulations may also be used in electrochemical cells which utilize photon assisted redox reactions.

EXAMPLES

It will be understood that this invention is susceptible to modification in order to adapt it to different uses and conditions. The following examples are given for illustrative purposes only and are not intended to impose limitations on the subject invention.

EXAMPLE 1

A separator ink was formulated by dry mixing silica aerogel (SilCRON® G130, 300 m²/g, SCM Corporation, this aerogel was surface modified to improve dispersion in the ink solvent) with PVDF binder (Polyvinylidene Fluoride-Hexafluoropropylene copolymer, KYNAR® Flex 2801, Elf Atochem). This mixture was added stepwise to the ink solvent (BEEA, 2(2-Butoxy Ethoxy) Ethyl Acetate) to form a paste. The paste was blended on a three roll mill, and the remainder of the aerogel-PVDF mixture was blended into the paste on the three roll mill. The ink was formulated to contain a ratio of 15 parts PVDF binder to 85 parts of silica aerogel. This ratio can range from about 5:95 (PVDF:silica aerogel) to 35:65. A higher content of PVDF is preferred when thin separators are to be printed whereas lower contents of PVDF can be used for thicker separators. Once the PVDF:silica aerogel ratio was established, the solvent composition was adjusted to optimize the ink viscosity for subsequent screen printing. Typically, the solvent content of the ink ranges from 60% to 75% by mass.

The above ink was screen printed in rectangular patterns onto Ni current collectors. The ink deposits were then dried in a vacuum oven at 100° C. for 16 hours (to remove the BEEA solvent) followed by ten minutes in a convection oven at 210° C. (to melt the PVDF binder). The temperatures and durations of these two heating processes depend upon the solvent and binder that is used to formulate the ink and upon the thickness of the ink deposit. After this heating process, the thickness of the separator was measured with a micrometer. The separator was 55 $\mu$ thick. Electrolyte (1.0M LiClO4 in propylene carbonate) was dispersed into the separator and a nickel counter electrode was pressed against the separator to form a Ni/separator/Ni cell. The complex impedance of this cell was measured over the frequency range of 100,000 Hz to 0.01 Hz using a sinusoidal voltage amplitude of 5 mV. The specific ionic resistance of the electrolyte filled separator was computed from the measured complex impedance (at zero reactance) of the Ni/separator/Ni cell. The efficiency for ionic conduction in the separator is represented as the ratio $\rho°/\rho$, where $\rho°$ is the specific resistivity of the electrolyte and $\rho$ is the measured specific resistivity of the electrolyte filled separator. For this cell $\rho°/\rho=0.39$.

EXAMPLE 2

The same test was conducted as in example 1 except that alumina (instead of silica aerogel) was used in the separator ink formulation in the ratio of 70 parts alumina to 30 parts PVDF. This separator was 97 $\mu$ t. For this separator $\rho°/\rho=0.39$.

EXAMPLE 3

The same test was conducted as in example 1 except that titania (instead of silica aerogel) was used in the separator ink formulation in the ratio of 85 parts titania to 15 parts PVDF. This separator was 77 $\mu$ thick. For this separator, $\rho°/\rho=0.10$.

Hence, although the foregoing description of the preferred embodiment of the present invention has shown, described and pointed out the fundamental novel features of the invention, it will be understood that various omissions, substitutions, and changes in the form of the detail of the apparatus and method as illustrated as well as the uses thereof, may be made by those skilled in the art, without departing from the spirit of the present invention. Consequently, the scope of the present invention should not be limited to the foregoing discussions, but should be defied by the appended claims.

What is claimed is:

1. A process for fabricating a porous composite separator for an electrochemical cell which includes an electrode, comprising the steps of:
   disposing a solution of separator precursor on said electrode; and
   transforming said solution of separator precursor so that said solution of separator precursor forms a porous composite separator that adheres to said electrode.

2. The process of claim 1, wherein the step of disposing a solution of separator precursor on said electrode comprises disposing a solution comprised of a solid particulate material, a polymer binder for said solid particulate material and a solvent to dissolve said polymer binder.

3. The process of claim 2, wherein said solution of separator precursor comprises a ratio of said polymer binder to said solid particulate material of between 5/95 and 35/65.

4. The process of claim 2, wherein said solution of separator precursor contains 60% to 75% by mass of said solvent.

5. The process of claim 2, wherein said solid particulate material comprises a material selected from the group consisting of silica aerogel, fumed silica, silica gel, silica hydrogel, silica xerogel, silica sol, colloidal silica, alumina, titania, magnesia, kaolin, talc, diatomaceous earth, calcium silicate, calcium carbonate, magnesium carbonate, and mixtures thereof.

6. The process of claim 2, wherein said polymer binder comprises a material selected from the group consisting of polyvinyl chloride, polyvinylidene fluoride-hexafluoropropylene copolymer and ethylene propylene hexadiene monomer.

7. The process of claim 2, wherein said solvent comprises 2(2-Butoxy Ethoxy) Ethyl Acetate.

8. The process of claim 1, wherein said step of disposing a solution of separator precursor on said electrode comprises using a printing technique to dispose said solution of precursor on said electrode.

9. The process of claim 1, wherein said step of transforming said solution of separator precursor on said electrode comprises:
   first drying said solution of separator precursor to form a layer of separator material; and
   subsequently curing said layer of separator material to form a porous separator layer.

10. The process of claim 9, wherein said step of drying comprises applying heat to said solution of separator precursor in a vacuum oven at a temperature of about 90–130° C. so that said solution of separator precursor forms said layer of separator material.

11. The process of claim 9, wherein said step of curing comprises applying heat to said separator precursor in an convection oven at a temperature of about 190° C. to 240° C. so that said layer of separator material transforms into said layer of porous composite separator.

12. The process of claim 11, wherein said porous composite separator layer has a thickness in the range of 5 $\mu$ to 100 $\mu$.

13. A process of forming a microporous separator for an electrochemical cell which includes an electrode, comprising:
   printing a continuous layer of said separator on said electrode; and
   drying said layer to form micropores therein.

14. The process of claim 13, wherein said step of drying comprises applying heat to said continuous layer of separator on said electrode in a vacuum oven at a temperature of about 90–130° C.

15. The process of claim 13, further comprising curing said continuous layer of said separator by applying heat to said separator precursor in a convection oven at a temperature of about 190° C. to 240° C.

16. The process of claim 13, wherein said step of printing said continuous layer of said separator on said electrode comprises using either a stencil or a screen printing technique.

17. The process of claim 13, wherein said step of printing said continuous layer of said separator on said electrode comprises disposing a solution comprised of a solid particulate material, a polymer binder for said solid particulate material and a solvent to dissolve said polymer binder on said electrode.

18. A process of forming a microporous separator for an electrochemical cell which includes an electrode, comprising:
   conformally bonding a continuous layer of said separator on said electrode; and
   drying said layer to form micropores therein.

19. The process of claim 18, wherein the step of conformally bonding said continuous layer of said separator on said electrode comprises disposing a solution comprised of a solid particulate material, a polymer binder for said solid particulate material and a solvent to dissolve said polymer binder.

20. The process of claim 19, wherein said step of disposing said solution on said electrode comprises using a printing technique to dispose said solution on said electrode.

* * * * *